(12) United States Patent
Liu

(10) Patent No.: US 11,507,209 B1
(45) Date of Patent: Nov. 22, 2022

(54) STYLUS PEN

(71) Applicant: Chicony Electronics Co., Ltd., New Taipei (TW)

(72) Inventor: Chin-Sheng Liu, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 0 days.

(21) Appl. No.: 17/718,973

(22) Filed: Apr. 12, 2022

(30) Foreign Application Priority Data

May 12, 2021 (TW) .................................. 110117177

(51) Int. Cl.
  *G06F 3/0354* (2013.01)
  *G06F 3/041* (2006.01)
  *G06F 3/038* (2013.01)

(52) U.S. Cl.
  CPC ........ *G06F 3/03546* (2013.01); *G06F 3/0383* (2013.01); *G06F 3/0416* (2013.01); *G06F 2203/04105* (2013.01)

(58) Field of Classification Search
  None
  See application file for complete search history.

(56) References Cited

U.S. PATENT DOCUMENTS

| | | | |
|---|---|---|---|
| 7,077,594 B1* | 7/2006 | Annerino ............ | G06F 3/03545 16/427 |
| 8,599,143 B1* | 12/2013 | Rymarz .............. | G06F 3/03545 345/173 |
| 2011/0074741 A1* | 3/2011 | Liang .................. | G06F 3/03545 345/179 |
| 2011/0310065 A1* | 12/2011 | Liang ................... | G06F 1/1626 345/179 |
| 2016/0109965 A1* | 4/2016 | Chan ................... | G06F 3/03545 345/179 |

* cited by examiner

*Primary Examiner* — Nicholas J Lee
(74) *Attorney, Agent, or Firm* — Muncy, Geissler, Olds & Lowe, P.C.

(57) ABSTRACT

A stylus pen includes a hollow pen tube, a circuit board, a pen core body, a stopping member, and a positioning assembly. The hollow pen tube extends along an axial direction and includes a pen tip end and a pen tail end. The circuit board includes a first surface and a second surface. The first surface is provided with a trigger element. The second surface faces the pen tail end. The stopping member is disposed in a pen tip chamber and adjacent to the first surface. The positioning assembly is disposed in a pen body chamber and includes a wedge-shaped fixing base and a limiting member. The wedge-shaped fixing base has an inclined surface. The limiting member is assembled on the inclined surface and abuts against the second surface, so that the first surface leans against the stopping member.

13 Claims, 8 Drawing Sheets

STYLUS PEN

CROSS-REFERENCE TO RELATED APPLICATION

This non-provisional application claims priority under 35 U.S.C. § 119(a) to Patent Application No. 110117177 filed in Taiwan, R.O.C. on May 12, 2021, the entire contents of which are hereby incorporated by reference.

BACKGROUND

Technical Field

The instant disclosure relates to an electronic product, in particular, to a stylus pen.

Related Art

With the development of technology, many electronic devices on the market (such as smart phones or tablet computers) adopt touch panels as operation input interfaces for users to operate. Moreover, in order to make the process of operating the touch panel faster and more precise, most people will choose stylus pens as input tools for touch sensing.

SUMMARY

Regarding a stylus pen known to the inventor, the pen core and the circuit board are disposed in the pen housing. When the pen core is forced, the circuit board is triggered to generate touch signals. However, it is understood that the circuit board, the pen housing, or the components in the pen housing will have manufacturing or assembling tolerances easily. As a result, when the circuit board is assembled in the pen housing, the circuit board cannot be positioned at the predetermined position, thereby reducing the production yield of the stylus pen.

In view of this, in one embodiment, a stylus pen is provided and comprises a hollow pen tube, a circuit board, a pen core body, a stopping member, and a positioning assembly. The hollow pen tube extends along an axial direction and comprises a pen tip end and a pen tail end opposite to the pen tip end. The pen tip end has an axial opening. The circuit board is disposed in the hollow pen tube and adjacent to the pen tip end. The circuit board divides the inside of the hollow pen tube into a pen tip chamber and a pen body chamber. The pen tip chamber is in communication with the axial opening. The circuit board comprises a first surface and a second surface opposite to the first surface. The first surface faces the axial opening and is provided with a trigger element. The second surface faces the pen tail end. The pen core body is disposed in the pen tip chamber. The pen core body comprises a touch end and a trigger end. The touch end protrudes out of the axial opening, and the trigger end corresponds to the trigger element of the circuit board. The stopping member is disposed in the pen tip chamber and adjacent to the first surface of the circuit board. The positioning assembly is disposed in the pen body chamber and adjacent to the second surface. The positioning assembly comprises a wedge-shaped fixing base and a limiting member. The wedge-shaped fixing base has an inclined surface. The inclined surface comprises a top portion and a bottom portion, and the bottom portion is nearer to the circuit board as compared to the top portion. The limiting member is assembled on the inclined surface and abuts against the second surface of the circuit board, so that the first surface of the circuit board leans against the stopping member.

Based on the above, in the stylus pen according to one or some embodiments of the instant disclosure, the wedge-shaped fixing base of the positioning assembly has an inclined surface. Therefore, during assembling the limiting member on the inclined surface, the limiting member can be guided by the inclined surface to move toward the circuit board so as to abut against the second surface of the circuit board, so that the first surface of the circuit board leans against the stopping member and is positioned at an expected correct position. Hence, the manufacturing tolerances of the components or assembling tolerances between the components can be prevented from affecting the production yield of the stylus pen.

BRIEF DESCRIPTION OF THE DRAWINGS

The disclosure will become more fully understood from the detailed description given herein below for illustration only, and thus not limitative of the disclosure, wherein.

DETAILED DESCRIPTION

Embodiments are provided for facilitating the descriptions of the instant disclosure. However, the embodiments are provided as examples for illustrative purpose, but not a limitation to the instant disclosure. In all the figures, the same reference numbers refer to identical or similar elements.

Figure 1:
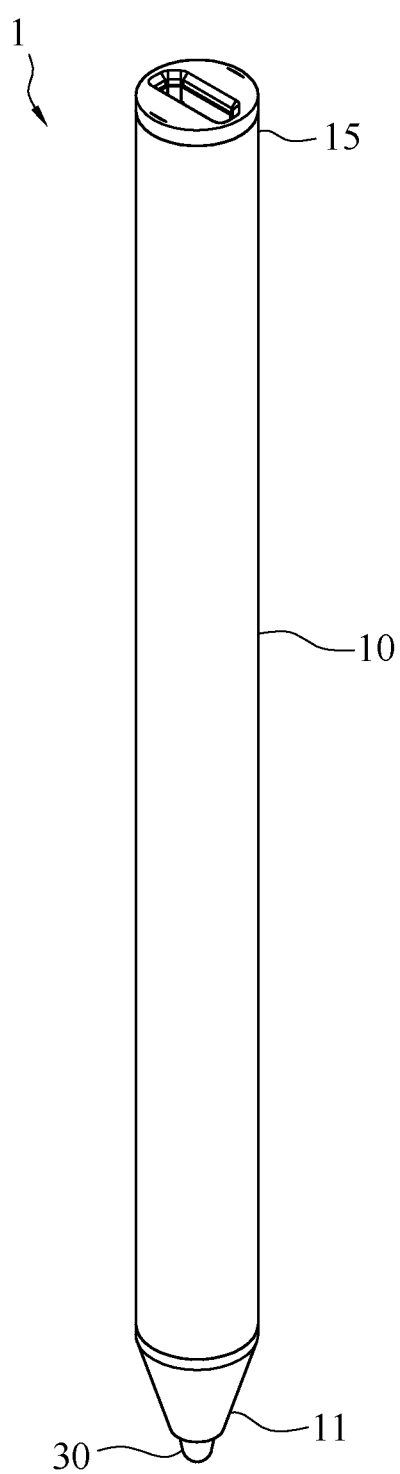
FIG. 1 illustrates a perspective view of a stylus pen according to an exemplary embodiment of the instant disclosure.
Figure 2:
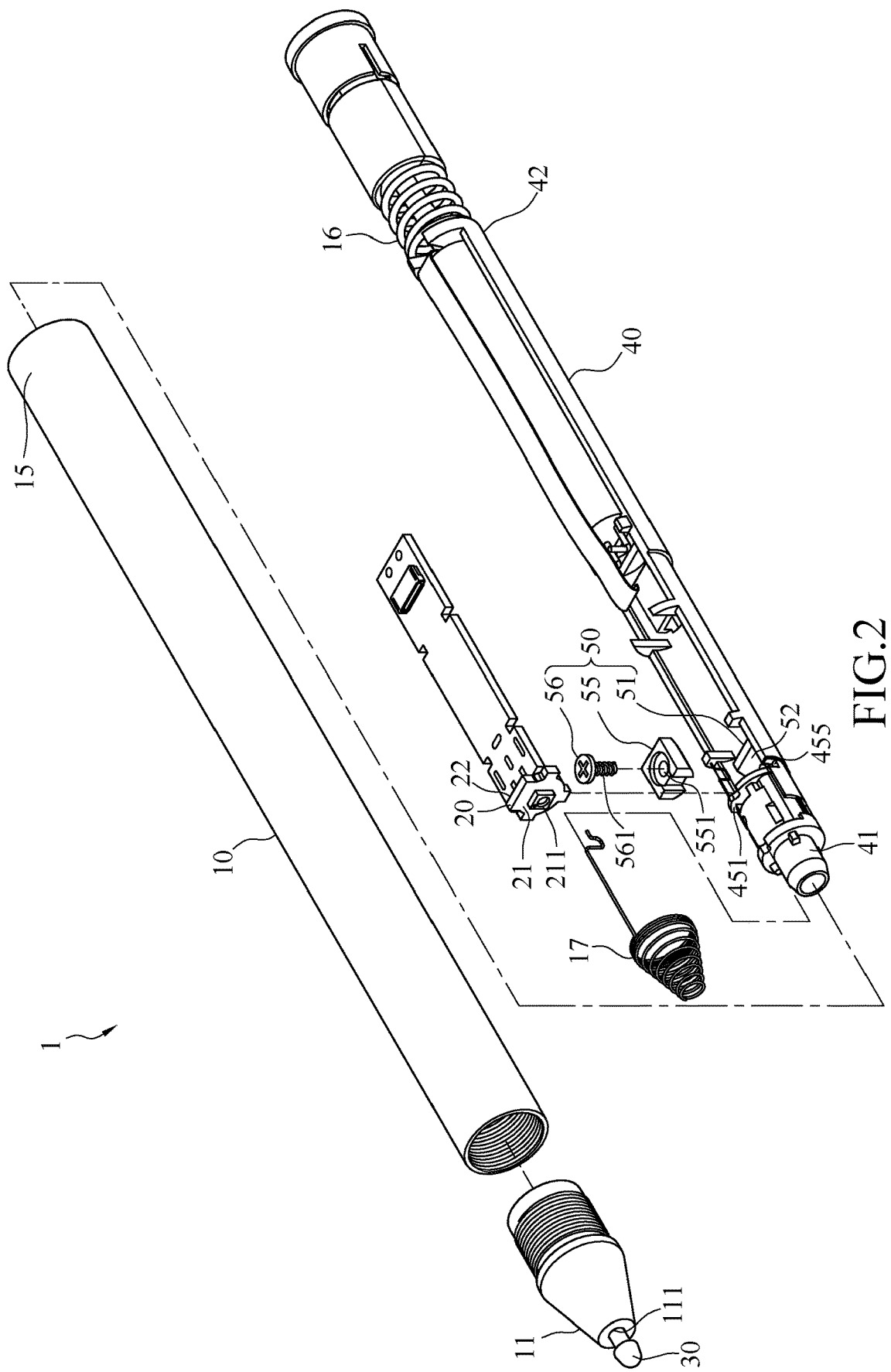
FIG. 2 illustrates an exploded view of the stylus pen of the exemplary embodiment.
Figure 3:
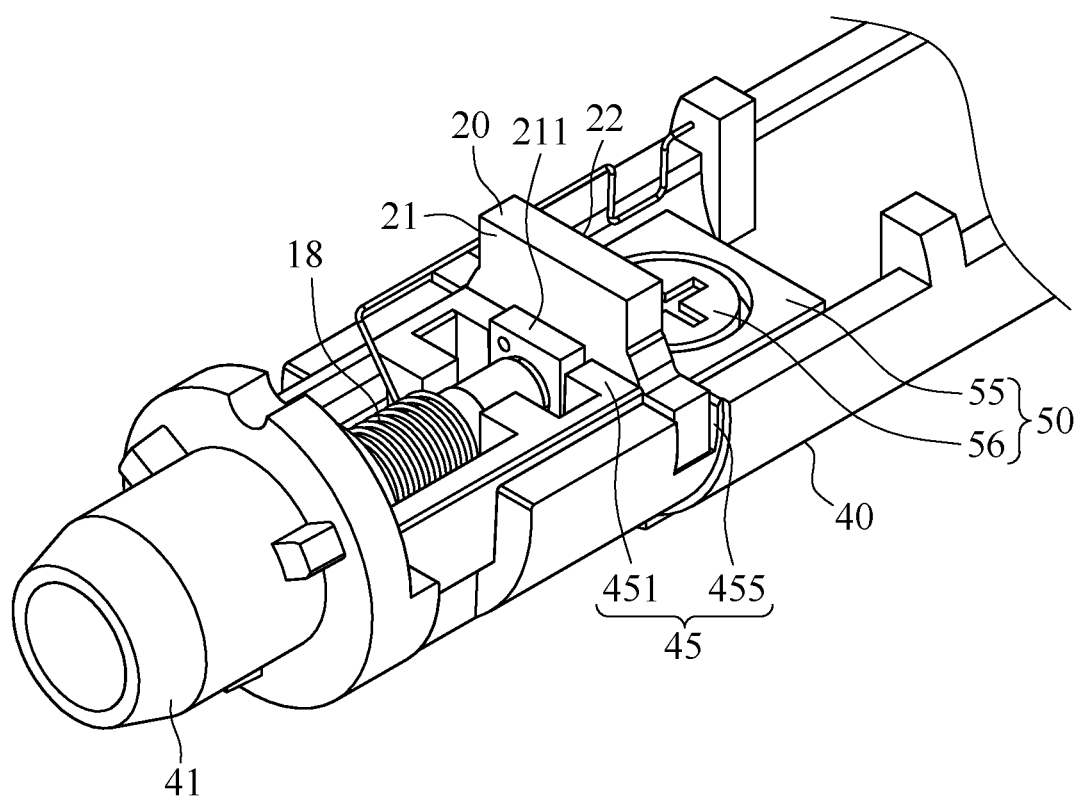
FIG. 3 illustrates an enlarged partial view of the stylus pen of the exemplary embodiment.
Figure 4:
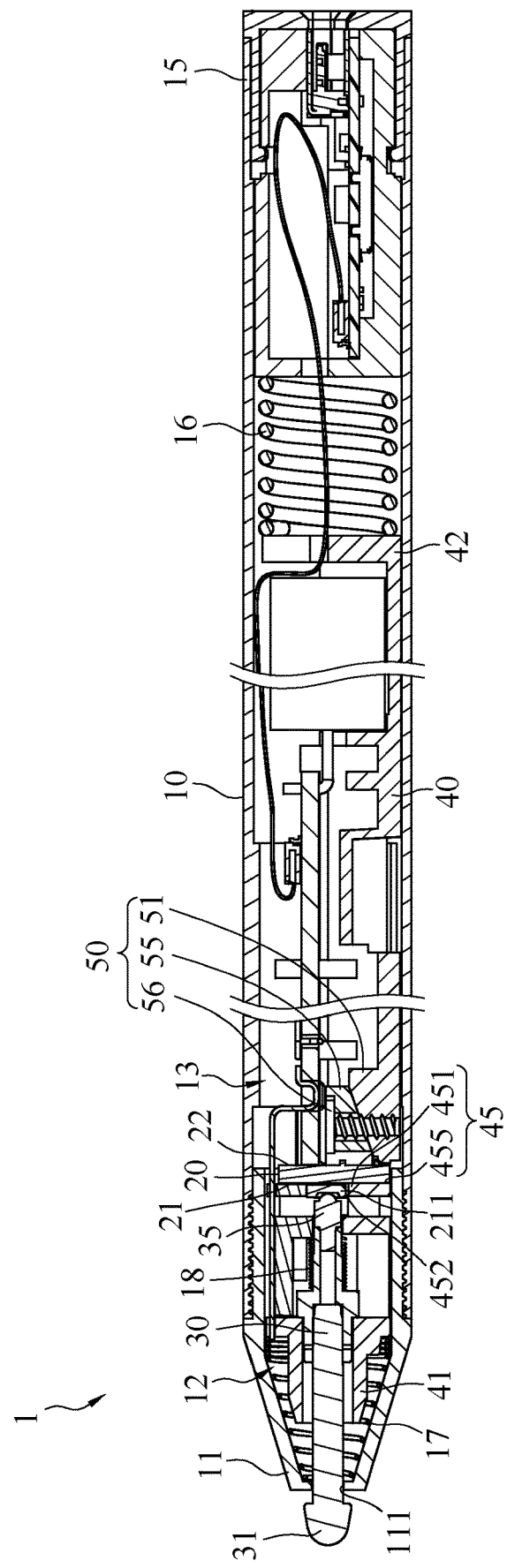
FIG. 4 illustrates a cross-sectional view of the stylus pen of the exemplary embodiment.
Figure 5:
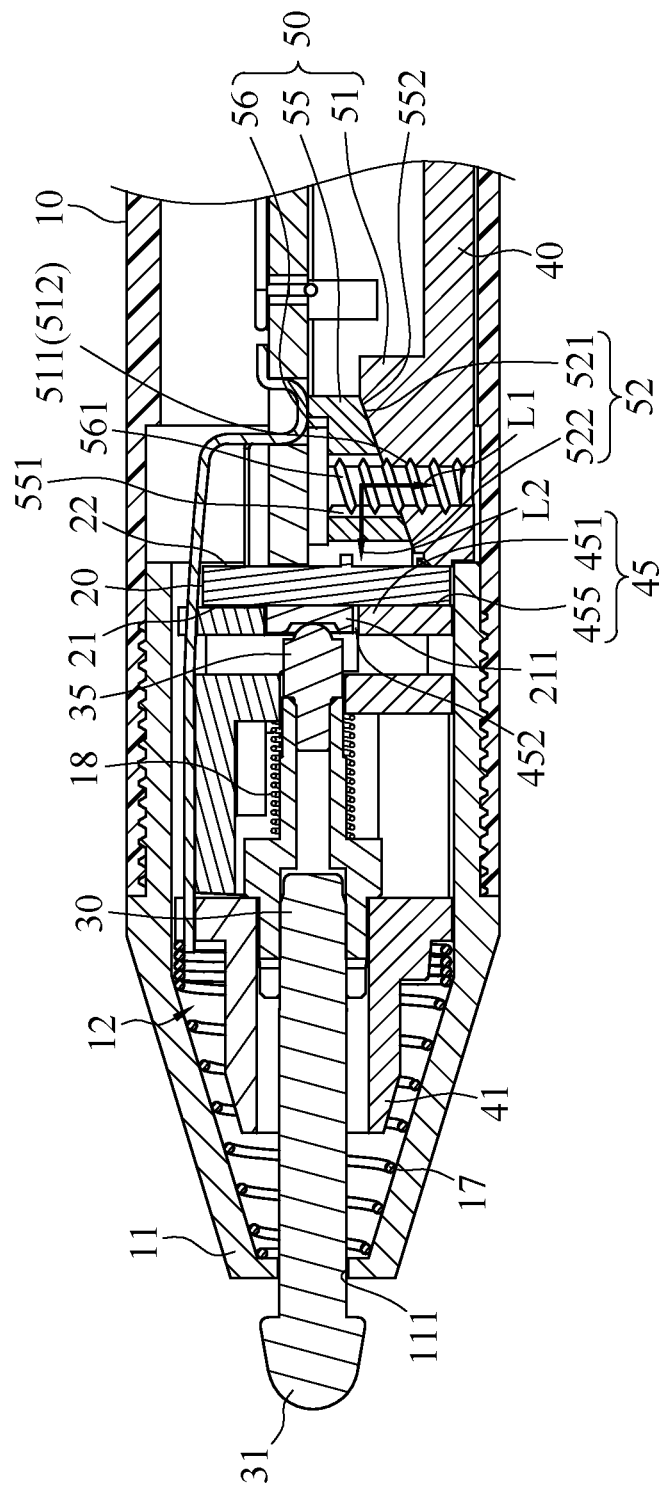
FIG. 5 illustrates a partial cross-sectional view of the stylus pen of the exemplary embodiment.
Figure 6:
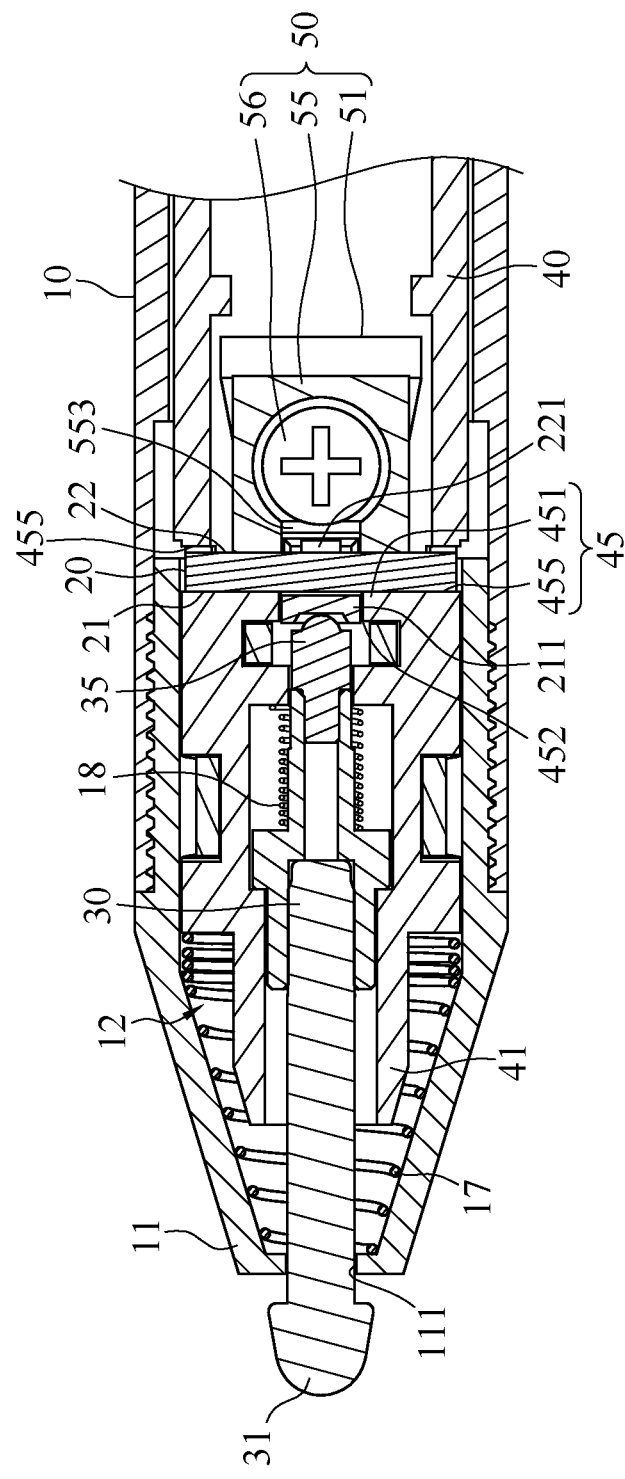
FIG. 6 illustrates another partial cross-sectional view of the stylus pen of the exemplary embodiment.

FIG. 1 illustrates a perspective view of a stylus pen according to an exemplary embodiment of the instant disclosure. FIG. 2 illustrates an exploded view of the stylus pen of the exemplary embodiment. FIG. 3 illustrates an enlarged partial view of the stylus pen of the exemplary embodiment. FIG. 4 illustrates a cross-sectional view of the stylus pen of the exemplary embodiment. FIG. 5 illustrates a partial cross-sectional view of the stylus pen of the exemplary embodiment. FIG. 6 illustrates another partial cross-sectional view of the stylus pen of the exemplary embodiment.

As shown in FIG. 1 to FIG. 5, the stylus pen 1 comprises a hollow pen tube 10, a circuit board 20, a pen core body 30, a stopping member 45, and a positioning assembly 50. The hollow pen tube 10 is an elongated hollow tubular body extending along an axial direction. In other words, in this embodiment, the axial direction is the extension direction of the hollow pen tube 10. The hollow pen tube 10 comprises a pen tip end 11 and a pen tail end 15. The pen tip end 11 and the pen tail end 15 are at opposite two ends of the hollow pen tube 10 along the axial direction. The circuit board 20, at least one portion of the pen core body 30, the stopping member 45, and the positioning assembly 50 are disposed in the hollow pen tube 10. The pen tip end 11 of the hollow pen tube 10 further has an axial opening 111. The axial opening 111 is in communication with the hollow pen tube 10, so that the pen core body 30 protrudes out of the pen tip end 11 from the axial opening 111.

As shown in FIG. 2 to FIG. 5, the circuit board 20 is adjacent to the pen tip end 11 of the hollow pen tube 10, and the circuit board 20 divides the inside of the hollow pen tube 10 into a pen tip chamber 12 and a pen body chamber 13. The pen tip chamber 12 is nearer to the axial opening 111 as compared to the pen body chamber 13 (in other words, in this embodiment, the distance between the pen tip chamber 12 and the axial opening 111 is less than the distance between the pen body chamber 13 and the axial opening 111). The pen tip chamber 12 is in communication with the axial opening 111. The circuit board 20 comprises a first surface 21 and a second surface 22 opposite to the first surface 21. The first surface 21 faces the axial opening 111 and is provided with a trigger element 211. The second surface 22 faces the pen tail end 15.

In some embodiments, the trigger element 211 may be a resistive switch, a capacitive switch, or an electromagnetic switch. For example, the trigger element 211 may be a pressure sensing element; e.g., the pressure sensing element may be a force sensing resistor, and the circuit board 20 generates a corresponding touching signal according to the pressure applied to the trigger element 211. However, embodiments are not limited thereto.

As shown in FIG. 2 to FIG. 5, the pen core body 30 is disposed in the pen tip chamber 12 of the hollow pen tube 10, and the pen core body 30 comprises a touch end 31 and a trigger end 35. The touch end 31 protrudes out of the axial opening 111, and the trigger end 35 corresponds to the trigger element 211 of the circuit board 20. Therefore, when the touch end 31 of the pen core body 30 is pressed, the trigger end 35 presses the trigger element 211 to allow the circuit board 20 to generate a corresponding touch signal.

For example, as shown in FIG. 4, a resilient spring 18 may be disposed in the hollow pen tube 10, and the resilient spring 18 abuts between the trigger element 211 and the pen core body 30. Preferably, in one embodiment, the pen core body 30 is pushed by the elastic force of the resilient spring 18 and is spaced from the trigger element 211 by a small gap (the distance between the pen core body 30 and the trigger element 211 may be 0.1 mm, 0.2 mm, or 0.3 mm, depending on different product requirements). Therefore, interference between the trigger end 35 and the trigger element 211 owing to the manufacturing tolerances of the trigger end 35 and the trigger element 211 or assembling tolerance between the trigger end 35 and the trigger element 211 can be prevented, thus the accuracy of the pressure sensing of the stylus pen does not be affected. However, embodiments are not limited thereto. Accordingly, when the touch end 31 of the pen core body 30 is pressed, the resilient spring 18 is compressed and moved toward the trigger element 211, so that the trigger end 35 presses the trigger element 211 to allow the circuit board 20 to generate the touch signal. On the other hand, when the pen core body 30 is released, the elastic force of the resilient spring 18 pushes the pen core body 30 to move resiliently toward the axial opening 111.

As shown in FIG. 2 to FIG. 5, the stopping member 45 is disposed in the pen tip chamber 12 and adjacent to the first surface 21 of the circuit board 20, and the stopping member 45 is adapted to limit the movement of the circuit board 20. In some embodiments, the stopping member 45 may be an element made of any rigid material. For example, the stopping member 45 may be a stopping plate, a stopping block, a protrusion rib, an insertion slot, or other structures which are disposed in the pen tip chamber 12 and capable of limiting the movement of the circuit board 20, and the detailed descriptions for the stopping member 45 is provided in the following paragraphs.

As shown in FIG. 4 to FIG. 6, the positioning assembly 50 is disposed in the pen body chamber 13 and adjacent to the second surface 22 of the circuit board 20. The positioning assembly 50 comprises a wedge-shaped fixing base 51 and a limiting member 55. In this embodiment, the wedge-shaped fixing base 51 is a block and has an inclined surface 52. The inclined surface 52 is a flat surface and comprises a top portion 521 and a bottom portion 522. The bottom portion 522 is nearer to the circuit board 20 as compared to the top portion 521 (namely, in this embodiment, the distance between the bottom portion 522 and the circuit board 20 is less than the distance between the top portion 521 and the circuit board 20). That is, in this embodiment, the inclined surface 52 inclines toward the circuit board 20. The limiting member 55 is also a block and is assembled on the inclined surface 52, and the limiting member 55 abuts against the second surface 22 of the circuit board 20 to make the first surface 21 of the circuit board 20 lean against and be positioned by the stopping member 45.

Moreover, as shown in FIG. 4 and FIG. 5, in this embodiment, the limiting member 55 is a wedge-shaped block and has an inclined surface 552. The inclined angle of the inclined surface 552 of the limiting member 55 and the inclined angle of the inclined surface 52 of the wedge-shaped fixing base 51 correspond to each other, and the inclined surface 552 of the limiting member 55 is closely attached to the inclined surface 52 of the wedge-shaped fixing base 51, but embodiments are not limited thereto. In some embodiments, the limiting member 55 is devoid of the inclined surface 552; instead, the limiting member 55 is obliquely assembled on the inclined surface 52 of the wedge-shaped fixing base 51.

Accordingly, in these embodiments, through assembling the limiting member 55 on the inclined surface 52, the limiting member 55 can be guided by the inclined surface 52 to move toward the circuit board 20 so as to abut against the second surface 22 of the circuit board 20, so that the circuit board 20 leans against the stopping member 45 and is positioned at an expected correct position. Hence, the manufacturing tolerances of the components or assembling tolerances between the components can be prevented from affecting the production yield of the stylus pen.

As shown in FIG. 5, the positioning assembly 50 comprises a positioning member 56. The positioning member 56 is inserted into and assembled with the limiting member 55 and the wedge-shaped fixing base 51 along a radial direction. The radial direction is perpendicular to the axial direction along which the hollow pen tube 10 extends. Therefore, during the process that the positioning member 56 is inserting into and assembling with the limiting member 55 and the wedge-shaped fixing base 51, the positioning member 56 provides the limiting member 55 with an action force along a direction toward the circuit board 20, and the action force allows the limiting member 55 to be guided by the inclined surface 52 to move toward the circuit board 20, so that the limiting member 55 abuts against the second surface 22 of the circuit board 20.

For example, as shown in FIG. 5, in this embodiment, the positioning member 56 is a screw and has a first thread 561 (in this embodiment, the first thread 561 is an outer thread). The limiting member 55 has a radial through hole 551, and the wedge-shaped fixing base 51 has an assembling portion 511 corresponding to the radial through hole 551. The assembling portion 511 is a screw hole and has a second thread 512 (in this embodiment, the second thread 512 is an inner thread). During assembling the positioning member 56, firstly, the limiting member 55 is placed on the inclined surface 52 of the wedge-shaped fixing base 51. Since the inclined surface 52 inclines toward the circuit board 20, the movement of the limiting member 55 can be limited primarily after the limiting member 55 is placed on the inclined surface 52, so that the limiting member 55 is not deflected toward a direction away from the circuit board 20. Next, the positioning member 56 passes through the radial through hole 551, and the positioning member 56 is rotated by using tools (such as torque wrenches or screw drivers), so that the first thread 561 of the positioning member 56 is threaded with the second thread 512 of the assembling portion 511. Moreover, during threading the positioning member 56 with the assembling portion 511, the tighter the positioning member 56 is locked along the radial direction (as shown by the arrow L1), the greater the action force applied to the limiting member 55 along the direction toward the circuit board 20 (as shown by the arrow L2) is, so that the first surface 21 of the circuit board 20 can be closely attached to the stopping member 55. In other words, in this embodiment, the limiting member 55 is placed on the inclined surface 52 of the wedge-shaped fixing base 51. Therefore, when the positioning member 56 is moved along the radial direction (as shown by the arrow L1), the positioning member 56 drives the limiting member 55 to move toward the circuit board 20 (as shown by the arrow L2). Therefore, through the movement of the limiting member 55, the positioning between the circuit board 20 and the stopping member 45 can be adjusted. Hence, in this embodiment, during the assembling process, the operator just needs to lock the positioning member 56 along the radial direction, so that the circuit board 20 can be ensured to be positioned at an expected correct position without being affected by the manufacturing tolerances of the components or assembling tolerances between the components. Accordingly, the assembling of the stylus pen can be conducted quickly and conveniently and the production yield of the stylus pen can be increased.

Moreover, as shown in FIG. 5, the hole diameter of the radial through hole 551 of the limiting member 55 is greater than the hole diameter of the assembling portion 511 and the diameter of the first thread 561 of the positioning member 56. Therefore, the limiting member 55 can be moved with respect to the inclined surface 52 of the wedge-shaped fixing base 51. Moreover, the greater the hole diameter of the radial through hole 551 is, the wider the movable range of the limiting member 55 is. Hence, the limiting member 55 can be adjusted according to circuit boards 20 with different thicknesses.

In some embodiments, the first thread 561 of the positioning member 56 may be an inner thread, and the second thread 512 of the assembling portion 511 may be an outer thread correspondingly.

In some embodiments, the positioning member 56 may be a rivet, a self-tapping screw, a bolt, a pin, or other positioning elements for assembling and positioning. The inclined angle of the inclined surface 52 of the wedge-shaped fixing base 51 may be 15 degrees, 20 degrees, 30 degrees, 45 degrees, 60 degrees, 75 degrees, etc., but embodiments are not limited thereto, and the inclined angle may be determined according to the product requirements. Moreover, when the inclined surface 52 has a greater inclined angle, the limiting member 55 can be ensured to move toward the circuit board 20 during the assembling process.

As shown in FIG. 6, in this embodiment, one side of the limiting member 55 abutting against the second surface 22 of the circuit board 20 further has a notch 553, the second surface 22 of the circuit board 20 is provided with an electronic component 221, and the electronic component 221 is received in the notch 553. For example, the electronic component 221 may be a processor, a resistor, a capacitor, an oscillator, etc. Therefore, since the limiting member 55 is further provided with the notch 553, the second surface 22 of the circuit board 20 can provide a space for disposing the electronic component 221, thereby increasing the space utilization rate of the circuit board 20.

Figure 7:
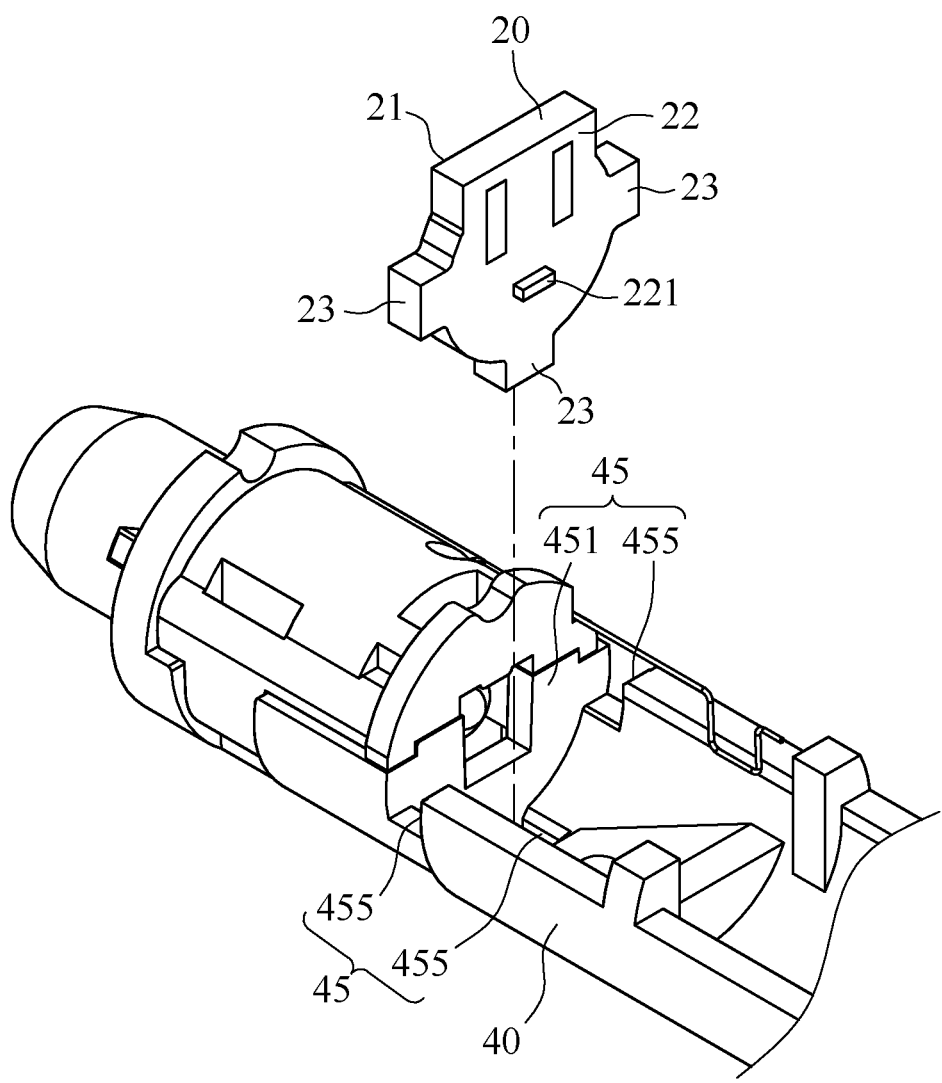
FIG. 7 illustrates another exploded view of the stylus pen of the exemplary embodiment.

FIG. 7 illustrates another exploded view of the stylus pen of the exemplary embodiment. As shown in FIG. 2 and FIG. 5 to FIG. 7, in this embodiment, the stylus pen 1 further comprises an elongated stand 40. The elongated stand 40 is disposed in the hollow pen tube 10 and extends along the axial direction. The circuit board 20, at least one portion of the pen core body 30, the stopping member 45, and the positioning assembly 50 are disposed on the elongated stand 40. In this embodiment, the wedge-shaped fixing base 51 of the positioning assembly 50 and the elongated stand 40 are integrally formed as a one-piece member. The stopping member 45 comprises a stopping block 451 and has at least one insertion slot 455. The stopping block 451 is disposed on the elongated stand 40, and the insertion slot 455 is on the elongated stand 40. In this embodiment, the number of the insertion slot 455 is three (as shown in FIG. 5 to FIG. 7, the number of the insertion slot 455 is not limited), and the three insertion slots 455 correspond to three different sides of the circuit board 20. The stopping block 451 is disposed between the three insertion slots 455, the three different sides of the circuit board 20 have three protrusions 23 respectively, and the three protrusions 23 are inserted into the three insertion slots 455. When the limiting member 55 is assembled on the inclined surface 52 and abuts against the second surface 22 of the circuit board 20, the first surface 21 of the circuit board 20 leans against both the stopping block 451 and a slot wall of each of the insertion slots 455 adjacent to the pen tip end 11. Therefore, the circuit board 20 can be firmly positioned.

In some embodiments, the stopping member 45 may only comprise a stopping block 451 and is devoid of the insertion slot 455. Alternatively, in some embodiments, the stopping member 45 may only have at least one insertion slot 455 and is devoid of the stopping block 451. Alternatively, in some embodiments, the stopping member 45 may be a stopping plate, a protrusion rib, or other rigid structures, but embodiments are not limited thereto.

Further, as shown in FIG. 4 and FIG. 5, in this embodiment, the stopping block 451 of the stopping member 45 further has a through hole 452, and the trigger element 211 on the first surface 21 of the circuit board 20 is received in the through hole 452. Therefore, the movement of the circuit board 20 along the radial direction can be further limited.

As shown in FIG. 4, in this embodiment, the elongated stand 40 comprises a first end 41 and a second end 42 opposite to the first end 41. The first end 41 is adjacent to the pen tip end 11 of the hollow pen tube 10, and the second end 42 is adjacent to the pen tail end 15 of the hollow pen tube 10. The hollow pen tube 10 is further provided with a spring 16, and the spring 16 abuts between the second end 42 and the pen tail end 15. Accordingly, the spring 16 provides the elongated stand 40 with a cushioning effect to prevent the elongated stand 40 from moving toward the pen tail end 15 when the elongated stand 40 is forced improperly (for example, when the stylus pen 1 falls down or when the pen core body 30 is squeezed by a foreign object to cause the elongated stand 40 to be forced improperly). Hence, the structural stability of the elongated stand 40 and the components on the elongated stand 40 (such as the circuit board 20, the pen core body 30, the stopping member 45, and the positioning assembly 50) can be maintained, thereby preventing the components inside the hollow pen tube 10 from being squeezed or impacted to be damaged.

Furthermore, as shown in FIG. 4, in this embodiment, the resilient spring 18 abuts between the elongated stand 40 and the pen core body 30, and the elastic force of the spring 16 is greater than the elastic force of the resilient spring 18. Therefore, when the touch end 31 of the pen core body 30 touches a touch panel to allow the pen core body 30 to press the resilient spring 18, the elastic force generated by the resilient spring 18 can be prevented from pushing the elongated stand 40 toward the pen tail end 15. Moreover, a cushioning spring 17 is further disposed in the hollow pen tube 10, and the cushioning spring 17 abuts between the first end 41 of the elongated stand 40 and the pen tip end 11 of the hollow pen tube 10. Therefore, the elongated stand 40 is sandwiched between the cushioning spring 17 and the spring 16, thereby further ensuring the structural reliability of the elongated stand 40 and the components on the elongated stand 40.

Figure 8:
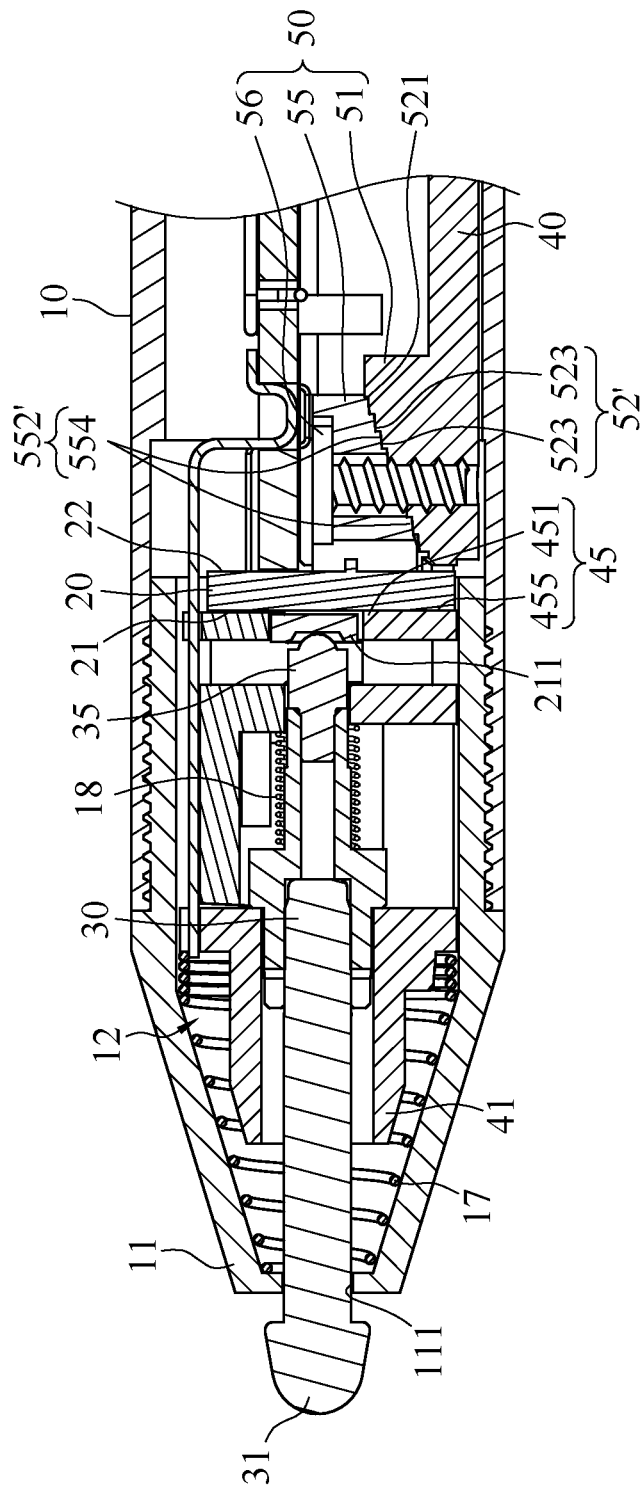
FIG. 8 illustrates a partial exploded view of a stylus pen according to another exemplary embodiment of the instant disclosure.

FIG. 8 illustrates a partial exploded view of a stylus pen according another exemplary embodiment of the instant disclosure. The difference between the embodiment shown in FIG. 8 and the embodiment shown in FIG. 5 is at least that in the embodiment shown in FIG. 8, the inclined surface 552' of the limiting member 55 further has at least one first stopping portion 554, the inclined surface 52' of the wedge-shaped fixing base 51 has at least one second stopping portion 523, and one side of the first stopping portion 554 adjacent to the top portion 521 leans against the second stopping portion 523. Therefore, the limiting member 55 can be further prevented from moving away the circuit board 20. In this embodiment, the inclined surface 552' of the limiting member 55 is a stepped inclined surface and has a plurality of first stopping portions 554 arranged as a stair, and the inclined surface 52' of the wedge-shaped fixing base 51 is also a stepped inclined surface and has a plurality of second stopping portions 523 arranged as a stair. Therefore, when the limiting member 55 is assembled on different positions of the inclined surface 52', the movement of the limiting member 55 can be limited by abutting the corresponding first stopping portion 554 against the corresponding second stopping portion 523. Therefore, the limiting member 55 can be prevented from moving away from the circuit board 20, and the circuit board 20 can be closely attached to the stopping member 45, thereby allowing the circuit board 20 to be firmly positioned.

Based on the above, in the stylus pen according to one or some embodiments of the instant disclosure, the wedge-shaped fixing base of the positioning assembly has an inclined surface. Therefore, the limiting member can be guided by the inclined surface to move toward the circuit board so as to abut against the second surface of the circuit board, so that the first surface of the circuit board leans against the stopping member and is positioned at an expected correct position. Hence, the manufacturing tolerances of the components or assembling tolerances between the components can be prevented from affecting the production yield of the stylus pen. Moreover, the trigger element can be properly positioned. Hence, when the user operates the touch panel through the stylus pen, the stylus pen can generate a touch signal corresponding to the user's operation force correctly.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A stylus pen comprising:
   a hollow pen tube extending along an axial direction, wherein the hollow pen tube comprises a pen tip end and a pen tail end opposite to the pen tip end, and the pen tip end has an axial opening;
   a circuit board disposed in the hollow pen tube and adjacent to the pen tip end, wherein the circuit board divides the inside of the hollow pen tube into a pen tip chamber and a pen body chamber, and the pen tip chamber is in communication with the axial opening; the circuit board comprises a first surface and a second surface opposite to the first surface; the first surface faces the axial opening and is provided with a trigger element, and the second surface faces the pen tail end;
   a pen core body disposed in the pen tip chamber, wherein the pen core body comprises a touch end and a trigger end, the touch end protrudes out of the axial opening, and the trigger end corresponds to the trigger element of the circuit board;
   a stopping member disposed in the pen tip chamber and adjacent to the first surface of the circuit board; and
   a positioning assembly disposed in the pen body chamber and adjacent to the second surface, wherein the positioning assembly comprises a wedge-shaped fixing base and a limiting member, the wedge-shaped fixing base has an inclined surface, the inclined surface comprises a top portion and a bottom portion, and the bottom portion is nearer to the circuit board as compared to the top portion;
   wherein the limiting member is assembled on the inclined surface and abuts against the second surface of the circuit board, so that the first surface of the circuit board leans against the stopping member.

2. The stylus pen according to claim 1, wherein the positioning assembly comprises a positioning member, the positioning member is inserted into and assembled with the limiting member and the wedge-shaped fixing base along a radial direction, and the radial direction is perpendicular to the axial direction.

3. The stylus pen according to claim 2, wherein the positioning member has a first thread, the limiting member has a radial through hole, and the wedge-shaped fixing base has an assembling portion corresponding to the radial through hole;
   wherein the assembling portion has a second thread, and the positioning member passes through the radial through hole and the first thread is threaded with the second thread.

4. The stylus pen according to claim 1, wherein the limiting member has a first stopping portion, the inclined surface of the wedge-shaped fixing base has a second stopping portion, and one side of the first stopping portion adjacent to the top portion leans against the second stopping portion.

5. The stylus pen according to claim 1, wherein one side of the limiting member abutting against the second surface of the circuit board further has a notch, the second surface is provided with an electronic component, and the electronic component is received in the notch.

6. The stylus pen according to claim 1, further comprising an elongated stand, wherein the elongated stand is disposed in the hollow pen tube and extends along the axial direction, and the circuit board, at least one portion of the pen core body, the stopping member, and the positioning assembly are disposed on the elongated stand.

7. The stylus pen according to claim 6, wherein the stopping member comprises a stopping block, and the stopping block is disposed on the elongated stand.

8. The stylus pen according to claim 7, wherein the stopping member has a through hole, and the trigger element is received in the through hole.

9. The stylus pen according to claim 6, wherein the stopping member has an insertion slot, the insertion slot is on the elongated stand, and one side of the circuit board is inserted into the insertion slot, so that the first surface abuts against a slot wall of the insertion slot adjacent to the pen tip end.

10. The stylus pen according to claim 6, wherein the elongated stand has a first end and a second end, the first end is adjacent to the pen tip end, and the second end is adjacent to the pen tail end;

wherein the hollow pen tube is further provided with a spring, and the spring abuts between the second end and the pen tail end.

11. The stylus pen according to claim 10, wherein a cushioning spring is further disposed in the hollow pen tube, and the cushioning spring abuts between the first end and the pen tip end.

12. The stylus pen according to claim 10, wherein a resilient spring is further disposed in the hollow pen tube, the resilient spring abuts between the elongated stand and the pen core body, and an elastic force of the spring is greater than an elastic force of the resilient spring.

13. The stylus pen according to claim 1, wherein the trigger element is a pressure sensing element.

* * * * *